US012645464B2

(12) United States Patent
Hoban et al.

(10) Patent No.: US 12,645,464 B2
(45) Date of Patent: Jun. 2, 2026

(54) ARTIFICIAL INTELLIGENCE BASED CONFIGURATION OF COMPUTING INFRASTRUCTURE ON CLOUD PLATFORMS

(71) Applicant: Pulumi Corporation, Seattle, CA (US)

(72) Inventors: Lucas James Hoban, Seattle, WA (US); Aaron Michael Friel, Oakland, CA (US); John Joseph Duffy, Greenbank, WA (US); Christian David Nunciato, Bothell, WA (US); Zachary Chase, Seattle, WA (US)

(73) Assignee: Pulumi Corporation, Seattle, WA (US)

( * ) Notice: Subject to any disclaimer, the term of this patent is extended or adjusted under 35 U.S.C. 154(b) by 22 days.

(21) Appl. No.: 18/634,749

(22) Filed: Apr. 12, 2024

(65) Prior Publication Data

US 2025/0321746 A1 Oct. 16, 2025

(51) Int. Cl.
*G06F 9/4401* (2018.01)

(52) U.S. Cl.
CPC .................................. *G06F 9/4401* (2013.01)

(58) Field of Classification Search
CPC ...................................................... G06F 9/4401
See application file for complete search history.

(56) References Cited

U.S. PATENT DOCUMENTS

| | | | | |
|---|---|---|---|---|
| 11,630,747 | B1 * | 4/2023 | Deboy ................ | G06F 11/0709 |
| | | | | 714/22 |
| 11,822,438 | B1 * | 11/2023 | Arora .................. | G06F 11/0754 |
| 12,236,212 | B1 * | 2/2025 | Ismail ................. | G06F 9/44505 |
| 12,355,626 | B1 * | 7/2025 | Varakantam .......... | H04L 67/535 |
| 2020/0379816 | A1 * | 12/2020 | Lin ....................... | G06F 9/5072 |
| 2022/0114023 | A1 * | 4/2022 | Choksi .................. | G06F 9/4411 |
| 2023/0037416 | A1 * | 2/2023 | Hoban ................... | G06F 9/454 |
| 2023/0075183 | A1 * | 3/2023 | Copty ..................... | G06F 8/51 |
| 2023/0186117 | A1 * | 6/2023 | Durvasula ............... | G06N 3/09 |
| | | | | 706/12 |
| 2023/0259390 | A1 * | 8/2023 | Howley ................... | G06F 8/63 |
| | | | | 718/102 |
| 2024/0160557 | A1 * | 5/2024 | Bolshakov .......... | G06F 11/3692 |
| 2025/0068397 | A1 * | 2/2025 | Kandasamy ............. | G06F 8/35 |
| 2025/0077238 | A1 * | 3/2025 | Obando Chacon ... | G06F 40/284 |

(Continued)

*Primary Examiner* — Faisal M Zaman
(74) *Attorney, Agent, or Firm* — Fenwick & West LLP

(57) ABSTRACT

A system receives a natural language request for configuring a computing infrastructure using a cloud platform. The system executes a machine learning based language model to generate infrastructure-as-code (IaC) to configure a cloud platform to obtain the desired computing infrastructure. The system may display the IaC generated by the machine learning based language model via a user interface as an example for use by the user. The system may send instructions to the cloud platform to provision computing infrastructure in accordance with the IaC obtained from the machine learning based language model. The system may repeatedly determine whether the desired computing infrastructure is deployed on the cloud platform and if the computing infrastructure currently provisioned on the cloud platform fails to match the desired computing infrastructure according to the natural language request, the system reconfigures the computing infrastructure deployed on the cloud platform.

20 Claims, 11 Drawing Sheets

(56) References Cited

U.S. PATENT DOCUMENTS

| | | | |
|---|---|---|---|
| 2025/0106118 A1* | 3/2025 | Ho | G06N 3/08 |
| 2025/0117369 A1* | 4/2025 | Agarwal | G06F 16/212 |
| 2025/0165238 A1* | 5/2025 | Jiang | G06F 8/60 |
| 2025/0165381 A1* | 5/2025 | Dakov | G06F 11/3698 |
| 2025/0208837 A1* | 6/2025 | Flaherty | G06F 8/33 |
| 2025/0321719 A1* | 10/2025 | Hoban | G06F 8/34 |

* cited by examiner

AI-Based Cloud Platform Interface 150

Natural Language Based User Interface 410

IaC Generation Module 420

Automatic Provisioning Module 430

Language Model Interface 440

Cloud Schema Repository 450

Structured Index 460

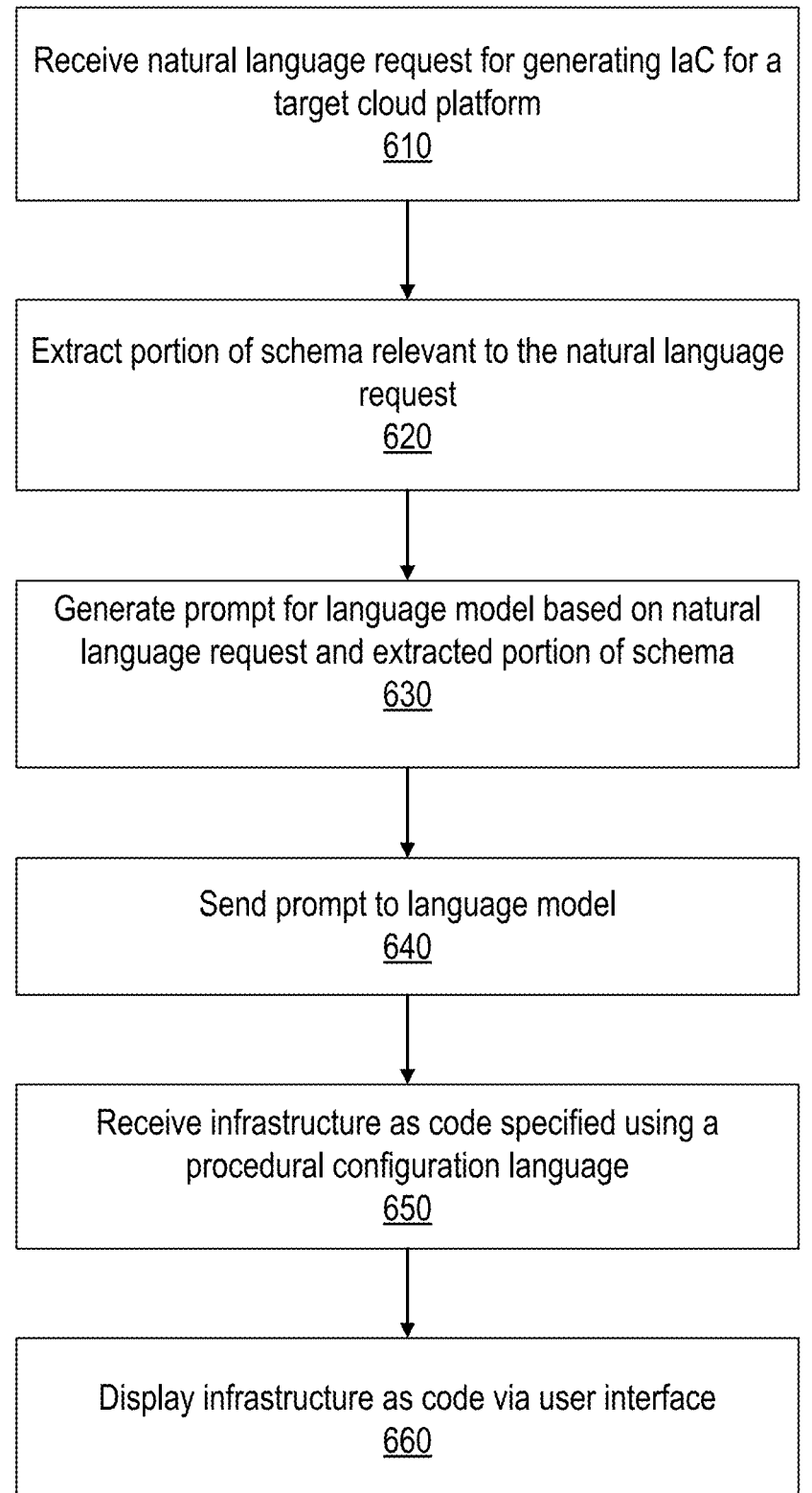

Receive natural language request for generating IaC for a
target cloud platform
610

Extract portion of schema relevant to the natural language
request
620

Generate prompt for language model based on natural
language request and extracted portion of schema
630

Send prompt to language model
640

Receive infrastructure as code specified using a
procedural configuration language
650

Display infrastructure as code via user interface
660

FIG. 6

ARTIFICIAL INTELLIGENCE BASED CONFIGURATION OF COMPUTING INFRASTRUCTURE ON CLOUD PLATFORMS

TECHNICAL FIELD

The disclosed embodiments generally relate to management of cloud infrastructure and more specifically to artificial intelligence based management and configuring of computing infrastructure on cloud platform.

BACKGROUND

A computing infrastructure is the foundation of an information technology (IT) service and may include various resources hosted by third-party cloud computing services. Third-party cloud computing services such as Amazon Web Services (AWS™), Azure™, Google Cloud™, Kubernetes™, and others provide various cloud computing resources to individuals or organizations on demand. Recently, the number of cloud platforms has grown. For example, there are over one hundred cloud platforms available, each cloud platforms with several different types of resources available. A user trying to configure cloud resources is faced with millions of different possible types of resources that can be used. As a result, configuring resources on cloud platform requires technical expertise and knowledge of various cloud platforms and available resources. Furthermore, this is a cumbersome and error prone process and any errors may result in incorrect configuration of the resources on the cloud platform thereby causing delay in the overall development or deployment of software of an organization using the cloud platform.

SUMMARY

Systems and methods are disclosed for a desired state configuration system that allows users to use natural language requests to configure computing infrastructure on cloud platforms. The system uses artificial intelligence techniques, for example, machine learning based language models to generate infrastructure-as-code (IaC) for managing and configuring computing infrastructure on cloud platforms. The steps are described herein as being executed by a system, for example, a desired state configuration system.

According to an embodiment, the system generates IaC for configuring computing infrastructures on cloud platforms based on natural language requests received from users. The generated IaC may be used as an example that can either be used as it is or be further customized by the user. The system stores information describing cloud platforms as a plurality of schemas, each schema describing a resource model for the cloud platform that maps to application programming interfaces (APIs) for interacting with a cloud platform. The system receives a natural language request for generating IaC for configuring a computing infrastructure on a target cloud platform. The system generates a prompt requesting a machine learning based language model to generate IaC using a configuration language, for example, a procedural configuration language or a declarative configuration language to configure the requested computing infrastructure on a cloud platform. The system provides the prompt to the machine learning based language model for execution and obtains the response returned by the machine learning based language model. The response includes the IaC specified using the configuration language, for example, the procedural configuration language or the declarative configuration language. The system sends the IaC for displaying via a user interface of a client device. The system may configure a computing infrastructure described by the IaC on the cloud platform.

According to an embodiment, the system configures a computing infrastructure on a cloud platform specified using natural language requests received from users. The system generates a prompt requesting a machine learning based language model to generate IaC to configure the requested computing infrastructure using the cloud platform. The system provides the prompt to the machine learning based language model and obtains the IaC generated by the machine learning based language model. The system sends instructions to the cloud platform to provision the computing infrastructure in accordance with the IaC obtained from the machine learning based language model. The system determines whether the desired computing infrastructure is configured on the cloud platform. If the computing infrastructure currently provisioned on the cloud platform fails to match the desired computing infrastructure according to the natural language request, the system reconfigures the computing infrastructure on the cloud platform. The system may revise the prompt to reconfigure the cloud platform and sends the revised prompt to the machine learning based language model. The above steps may be iterated multiple times to revise the prompt and reconfigure the computing infrastructure on the cloud platform until the computing infrastructure actually configured on the cloud platform matches the desired computing infrastructure as requested by the user using the natural language requests.

The processes described above are cloud platform independent and the system can configure the computing infrastructure on any cloud platform. For example, the system may build the same computing infrastructure specified using natural language on different cloud platforms or a combination of multiple cloud platforms. Similarly, the system may use a configuration language to specify the IaC, for example, JavaScript, TypeScript, Python, Go, C#, F #, or HCL for configuring the computing infrastructure using a cloud platform. The configuration language may be a procedural configuration language or a declarative configuration language.

According to an embodiment, the system interacts with a language model service that executes the machine learning based language model for generating IaC from natural language descriptions provided by the user. The system executes the machine learning based language model by invoking the APIs (application programming interfaces) of the language model service.

According to an embodiment, the system stores information describing the plurality of schemas in a structured index associated with the machine learning based language model. Examples of structured index include GPT (generative pretrained transformer) Index™ or Llama Index™. The system generates appropriate prompts for the machine learning based language model to execute the machine learning based language model to generate the IaC using the schema for the target cloud platform stored in the structured index.

According to an embodiment, the system receives a pretrained machine learning based language model and further trains the machine learning based language model using training dataset comprising the plurality of schemas and description of various cloud platforms. Accordingly, the machine learning based language model is available locally at the system and can be executed by invoking the machine learning based language model directly rather than sending a request to an external language model service.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 6 shows an exemplary process for generating IaC for a cloud platform using machine learning based language model, according to example embodiments.

Figure 1:
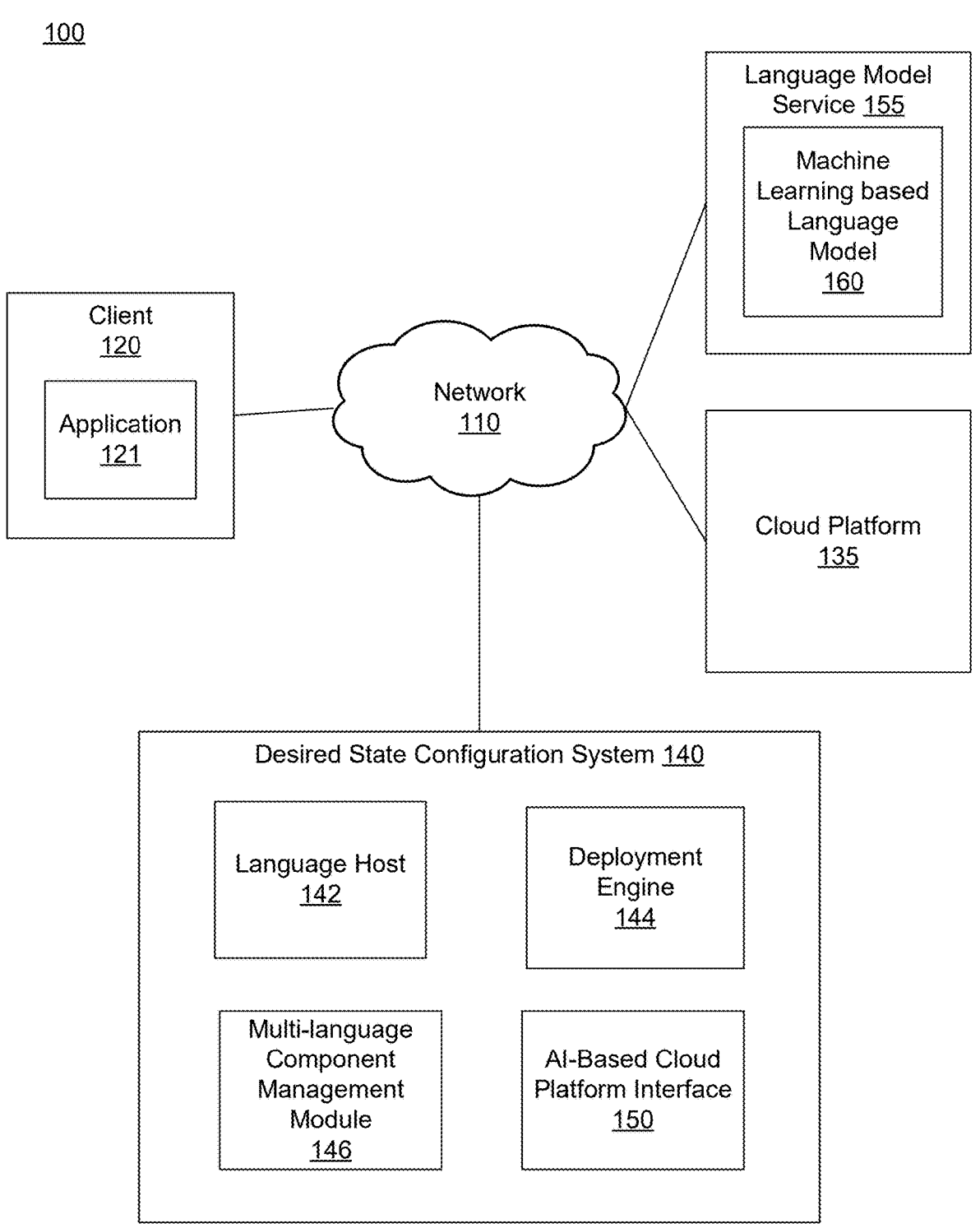
FIG. 1 shows a diagram of a system environment of a desired state configuration system for configuring computing infrastructure on cloud platforms based on natural language descriptions received from users, according to example embodiments.

The figures depict various embodiments of the present technology for purposes of illustration only. One skilled in the art will readily recognize from the following description that other alternative embodiments of the structures and methods illustrated herein may be employed without departing from the principles of the technology described herein.

DETAILED DESCRIPTION

Due to an increase in the number of cloud platforms available as well as increase in the number of resources available in each cloud platform, it is challenging for teams working with cloud platforms to configure cloud infrastructure resources. One of the constant challenges for teams working with cloud platforms is finding specific examples that cover the set of cloud infrastructure resources and configurations that they require. A system may store a repository of examples for providing to users. However, often the examples stored may not match the specific requirements. Also, often specific combination of technologies that a user needs may not have been captured and stored yet.

As an example, if a user wants to run a BI (business intelligence) tool on a particular cloud platform, the user can perform research on the internet to identify some guides that discuss the specific platforms and tools that the user needs. However, the user needs to do further study and analysis to determine the best compute and database options. Most available documentation provides very generic information, and much of the documentation may be old and out-of-date. As a result, users may spend significant amount of time to synthesize all the information on this subject and turn it into a working Infrastructure-as-Code (IaC) solution.

A system according to various embodiments uses generative artificial intelligence (AI) to generate examples that suit the specific needs of a user. More specifically, the system uses machine learning based language models, for example, large language models to generate IaC examples from natural language descriptions received from the user. The system provides a user interface that receives natural language descriptions or requests from users describing the desired cloud infrastructure and generates examples of IaC specific to needs of the user. A user can provide a natural language description of the required cloud infrastructure, for example, "a static website using Azure cloud platform" and the system generates IaC for configuring the requested cloud infrastructure on a cloud platform using a configuration language such as TypeScript, JavaScript, Python, or any of the configuration languages supported by the system.

According to an embodiment, the system interfaces with the cloud platform to automatically provision and deploy the resources to build the cloud infrastructure requested by the user. The system checks if any errors resulted from deployment of the cloud infrastructure. If the system determines that the cloud platform returned errors, the system modifies the prompt provided to the machine learning based language model to generate a modified IaC and reconfigures the cloud infrastructure until the errors are fixed. Accordingly, the system iteratively fine tunes the cloud infrastructure based on the needs of the user.

The systems and methods disclosed herein provide several technical advantages. For example, the systems and methods disclosed herein provide a solution for a user to generate IaC using natural language for managing and provisioning resources on various cloud platforms. The IaC generated may use different configuration languages and works across different cloud platforms. The system automatically configures the cloud platforms and checks any errors in the configuration and iteratively reconfigures the cloud platform until the desired configuration is obtained.

Furthermore, the system does not have to maintain an extensive repository of examples that continue to grow over time. Searching through a large repository of resources requires creating and maintaining a text search index. The system disclosed does not require such a repository or index. As a result, the techniques disclosed herein improve on storage and computing resources of computing systems that may be used for storing and maintaining such repository and indexes as well as searching through such a repository.

The system provides an improved user experience and simplifies the user interface available to users who want to configure infrastructure on cloud platforms. The system allows users to provide high-level natural language description without requiring the user to provide specific details of each component of the computing infrastructure being configured on the cloud platform. This allows users to perform the required tasks without having the necessary knowledge or information of individual cloud platforms, their available resources, and technical knowledge for configuring the resources. The system uses machine learning based language model to predict the user's intent behind the natural language requests.

It is possible that the system may configure a computing infrastructure or generate an IaC that fails to match the user's actual intent. In this case, the system receives a description of the discrepancies from the user to regenerate the IaC or reconfigure the computing infrastructure to conform to the user requests. Accordingly, the system provides improved user experience by allowing users to configure cloud infrastructure using natural language text that does not have to conform to a specific syntax and does not require users to provide all the details needed by the cloud platform for creating the computing infrastructure.

System Overview

FIG. 1 shows a diagram of a system environment of a desired state configuration system for configuring computing infrastructure on cloud platforms based on natural language descriptions received from users, according to example embodiments. FIG. 1 shows a system environment 100 including, network 110, client device 120, a language model service 155, a cloud platform 135 and a desired state configuration system 140 that provides various services for users of client device 120 to manage infrastructure for an IT service. A cloud platform is also referred to herein as a cloud provider or a resource provider.

The network 110 may be any suitable communications network for data transmission. In some embodiments, the network 110 is the Internet and uses standard communications technologies and/or protocols. Thus, the network 110 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on the network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc. In other embodiments, the entities use custom and/or dedicated data communications technologies instead of, or in addition to, the ones described above.

In one embodiment, client devices 120 communicate with desired state configuration system 140 through network 110. Client devices 120 generally include devices and modules for communicating with multi-language component management module 146 and a user of client device 120. Other components of a client device 120 may include display device, one or more computer processors, local fixed memory (RAM and ROM), as well as optionally removable memory (e.g., SD-card), power sources, and audio-video outputs. A client device 120 may also be referred to herein as the client.

In another embodiment, client device 120 may communicate with desired state configuration system 140 through an application or software module, such as application 121.

The application 121 may be provided by desired state configuration system 140 for installation on client devices 120. Users of client device 120 may manage infrastructure of an IT service by using application 121 to access modules and resources provided by desired state configuration system 140. Application 121 may take various forms, such as a stand-alone application, an application plug-in, or a web console application (e.g., through webpages). Application 121 may generate an interface which is one means for performing this function.

Users of client devices 120 may wish to build an IT service with infrastructure including a set of resources with specific configurations (i.e. input parameters), and the specific configurations associated with the set of resources may be referred to as a desired state configuration for the infrastructure. For example, the user may specify a number of virtual machines connected with a number of storage units in a certain way described by a set of input parameters, and the set of input parameters associated with the infrastructure may be referred to as the desired state configuration for the infrastructure. The desired state configuration system 140 may be designed to manage the state of any sort of system, from operating system process state, to cloud-based infrastructure, to physical systems configuration. Users of client devices 120 may create computer programs (e.g., originating computer programs containing executable instructions) in supported programming languages such as Python, JavaScript, Go, and Typescript, etc. to manage resources provided by clout platform 135 through the application 121.

Cloud platform 135 may provide various cloud computing services or may be any other system that provides desired state configuration service to individuals and organizations. The cloud platform 135 may be referred to herein as cloud resource provider. Although embodiments are described in terms of cloud platforms or cloud resource providers, the techniques disclosed herein are applicable to any type of resource providers, including physical resource providers and component resource providers. Physical resource providers are providers that offer resources to individuals and organizations on demand and physical resource providers may manage resources on their own platforms. For example, AWS, Google Cloud, Azure, and Kubernetes are examples of physical resource providers that offer physical resources. Physical resources are resources offered and managed by physical resource providers, including but are not limited to processing power, virtual machines, data storage capacity, and networking. (The physical resources thus may include virtual resources, such as those of a cloud computing service, that ultimately correspond to a physical resource.) A user of the physical resource providers may manage state of a system through create, read, update and delete (also referred to as CRUD) operations to the physical resource providers. Component resource providers may be users of desired state configuration system 140 who are authors of component resources (also referred to as components). A component resource may be a logical grouping of resources, including both physical resources and component resources. For example, a component resource may include a physical resource and a child component resource that further includes multiple physical resources.

Desired state configuration system 140 includes a language host 142 that creates an environment for a program and executes the program, a deployment engine 144 that determines operations to be performed to reach a desired state configuration, and a multi-language component management module 146 that manages reusable multi-language components. A multi-language component is a reusable component that is authored in one language and may be used in an originating computer program written in a different supporting language. Desired state configuration system 140 may provide various modules and resources for managing infrastructure. The desired state configuration system 140 may support configuration for any system with a programmable interface, which could include physical systems, operating system state, etc. In the embodiment illustrated in FIG. 1, desired state configuration system 140 and the modules included are shown as a separate entity from client device 120, while in alternative embodiments, the modules may also be located locally on client device 120.

Language host 142 creates an environment for a program and executes the program in the environment generated for the program. Language host 142 may receive requests to launch a program that includes a set of parameters that describe a desired state configuration. Language host 142 may execute the program and launch an environment (e.g., runtime) based on the language in which the program is written. The language runtime prepares the program to be executed and detects necessary resource registrations. Language host 142 may notify respective cloud platforms 135 that may perform the necessary resource registration. When the new resources are registered, language host 142 sends a request to deployment engine 144 which further computes the operations needed to reach the desired state configuration.

Deployment engine 144 determines the operations to be performed to reach a desired state configuration from a given state configuration (e.g., the current state configuration of the system). Deployment engine 144 may receive a request from language host 142 indicating a list of resources needed for the desired state configuration. Deployment engine 144 receives the list and determines new resources to create and existing resources to delete based on the list of resources for desired state configuration and current state configuration. Deployment engine 144 may send remote procedure calls (RPCs) to cloud platforms 135 to perform operations (e.g., create, read, update, delete or CRUD operations) on physical resources. Thus, rather than achieving the desired state configuration by assembling that state from the starting point of a "blank slate," the deployment engine 144 instead starts from (e.g.) the current state configuration of the system and makes only the changes needed to achieve the desired state configuration. This has a number of advantages over a "blank slate" approach (such as tearing down a given cloud environment and starting over each time the system is reconfigured), such as typically requiring far fewer computing operations to achieve, preserving the state of the system (e.g., data subsequently entered by customers into databases), and providing much greater system uptime.

Multi-language component management module 146 manages creation and construction (e.g., deployment) of multi-language components. For example, the client device 120 may author a multi-language component using resources and modules provided by multi-language component management module 146 in a first language (e.g., TypeScript) and the created component is available for another client device 120 to use in another configuration language (e.g., Python), which is achieved through the following process.

Multi-language component management module 146 may generate a software development kit (SDK) for each supported language (e.g., JavaScript, TypeScript, Python, Go, C#, F #, HCL) based on a schema of the component that client device 120 authored (e.g., in JSON, TypeScript, or other source forms). Client device 120, who wishes to use the component in another language, imports the SDK in one of the supported languages (e.g., Python). Client device 120 may use the SDK to create an instance of the component with a set of input parameters. The instance of the component may be created based on the structure of the component with different input parameters. Multi-language component management module 146 may construct the resources included in the component.

Desired state configuration system 140 includes an AI-based cloud platform interface 150 that provides a natural language based interface to users for generating IaC for different cloud platforms using different configuration languages. The natural language interface makes it easy for users to interact with the system and allows them to manage resources on a cloud platform without requiring significant technical expertise on their part. For example, the users do not need the ability to program in any configuration language such as JavaScript, Python, TypeScript, and so on, to be able to configure desired computing infrastructures on a cloud platform.

The AI-based cloud platform interface 150 interacts with the language model service 155 for generating IaC from natural language requests received from users. The language model service 155 includes a machine learning based language model 160 and provides APIs (application programming interfaces) for allowing systems such as desired state configuration system 140 to execute the machine learning based language model 160. For example, the AI-based cloud platform interface 150 may generate prompts based on natural language requests received from users and send the prompts to the language model service 155 for providing to the machine learning based language model 160 for execution. The language model service 155 returns the response generated by the machine learning based language model 160 to the AI-based cloud platform interface 150.

The language model service 155 receives requests to perform various tasks, including but are not limited to, natural language processing (NLP) tasks, audio processing tasks, image processing tasks, video processing tasks, and the like. For example, the AI-based cloud platform interface 150 may receive natural language requests in text form or audio form and provide to the language model service 155 for processing. In one embodiment, the machine learning based language model 160 is a transformer neural network trained to receive sequential data tokenized into a sequence of input tokens and generates a sequence of output tokens depending on the task to be performed.

According to an embodiment, the machine learning based language model 160 receives a set of input tokens and generates a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in a particular natural language and generate a sequence of output tokens that represents a translation of the paragraph or sentence in another language that may be a programming language such as Python, JavaScript, or any of the languages used as configuration language by the desired state configuration system 140. For a text generation task, the transformer model may receive a prompt and continue the conversation or expand on the given prompt in human-like text.

In one embodiment, the machine learning based language model 160 is a large language model (LLMs) that is trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the desired state configuration system 140 or one or more entities different from the desired state configuration system 140. An LLM may be trained on a large amount of data from various data sources. For example, the data sources include websites, articles, API documentation, and the like. From this massive amount of data coupled with the computing power of LLM's, the LLM is able to perform various tasks and synthesize and formulate output responses based on information extracted from the training data.

In one embodiment, when the machine learning based language model 160 is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While an LLM with a transformer-based architecture is described as an embodiment, it is appreciated that in other embodiments, the machine learning based language model 160 can be configured as any other appropriate architecture including, but not limited to, long short-term memory (LSTM) networks, Markov networks, BART, generative-adversarial networks (GAN), diffusion models (e.g., Diffusion-LM), and the like. Furthermore, although embodiments illustrate the machine learning based language model 160 as being executed by a language model service 155, in other embodiments, the desired state configuration system 140 may train and store a machine learning based language model 160 locally such that invocation of the machine learning based language model 160 is performed using function invocations without requiring sending the request via the network 110.

Figure 2:
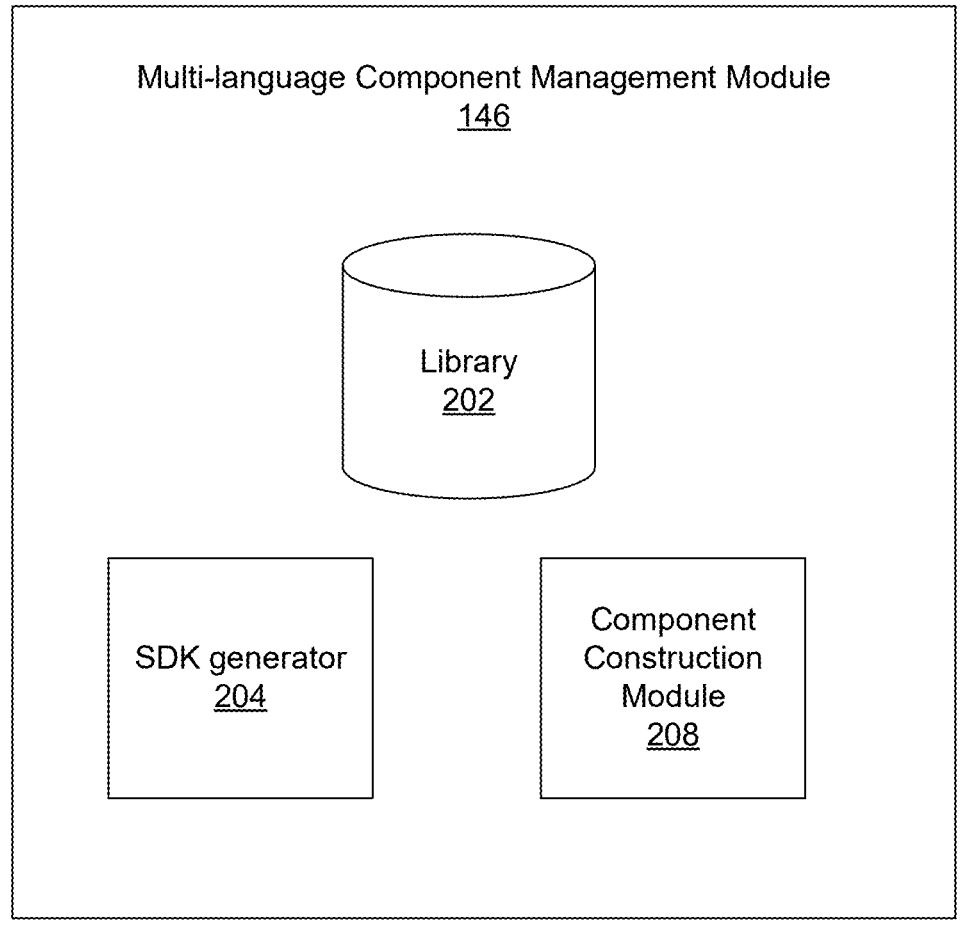
FIG. 2 shows a block diagram of the multi-language component management module, according to example embodiments.

FIG. 2 illustrates one embodiment of a variety of modules included in a multi-language component management module 146. In one embodiment, multi-language component management module 146 includes a library 202 that stores resources available for clients 120 to use, an SDK generator 204 that generates SDKs for a multi-language component and a component construction module 208 that constructs components and resources for a desired state configuration.

Figure 3A:
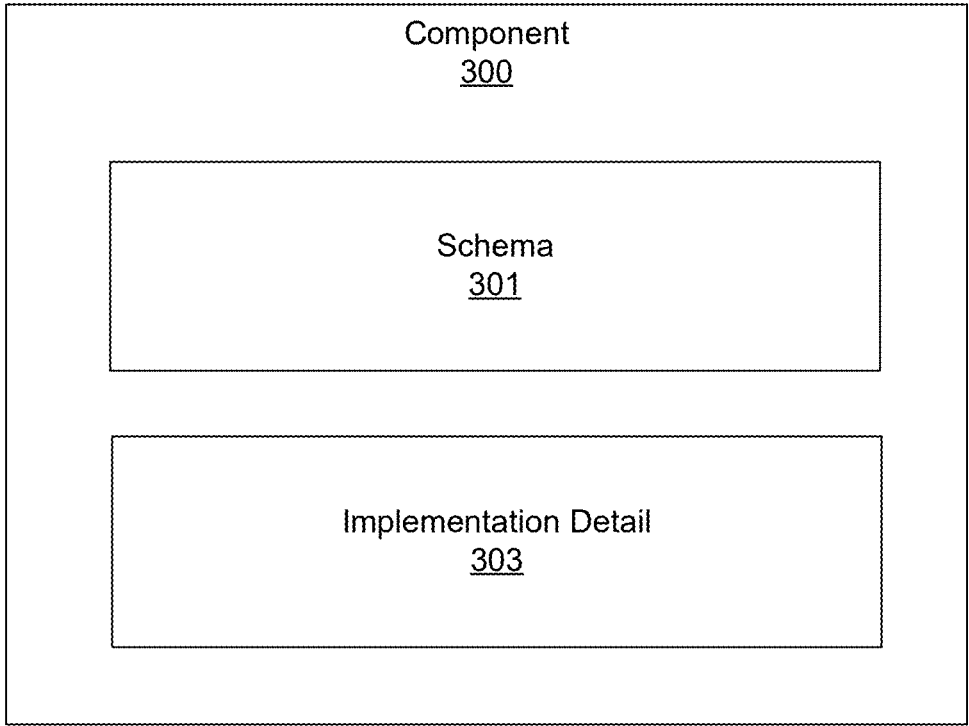
FIG. 3A shows an example data structure of a multi-language component, according to example embodiments.

Library 202 stores libraries available for clients 120 to use to manage desired state configuration for an infrastructure. For example, library 202 may store reusable multi-language components that client device 120 may import and reuse. In one embodiment, client device 120 may author a reusable multi-language component that is published and saved in library 202. Library 202 may also store the generated SDKs associated with components. Client device 120 may reuse the component by importing an SDK generated by the multi-language component management module 146. For example, FIG. 3A illustrates one exemplary data structure for a component 300 including schema 301 and implementation detail 303, where the schema 301 may contain information that describes content included in the component 300 and implementation detail 303 contains details such as the child components included in the component 300 and how the child components are wired together. Schema 301 is discussed in further detail in accordance with FIG. 3B.

Figure 3B:
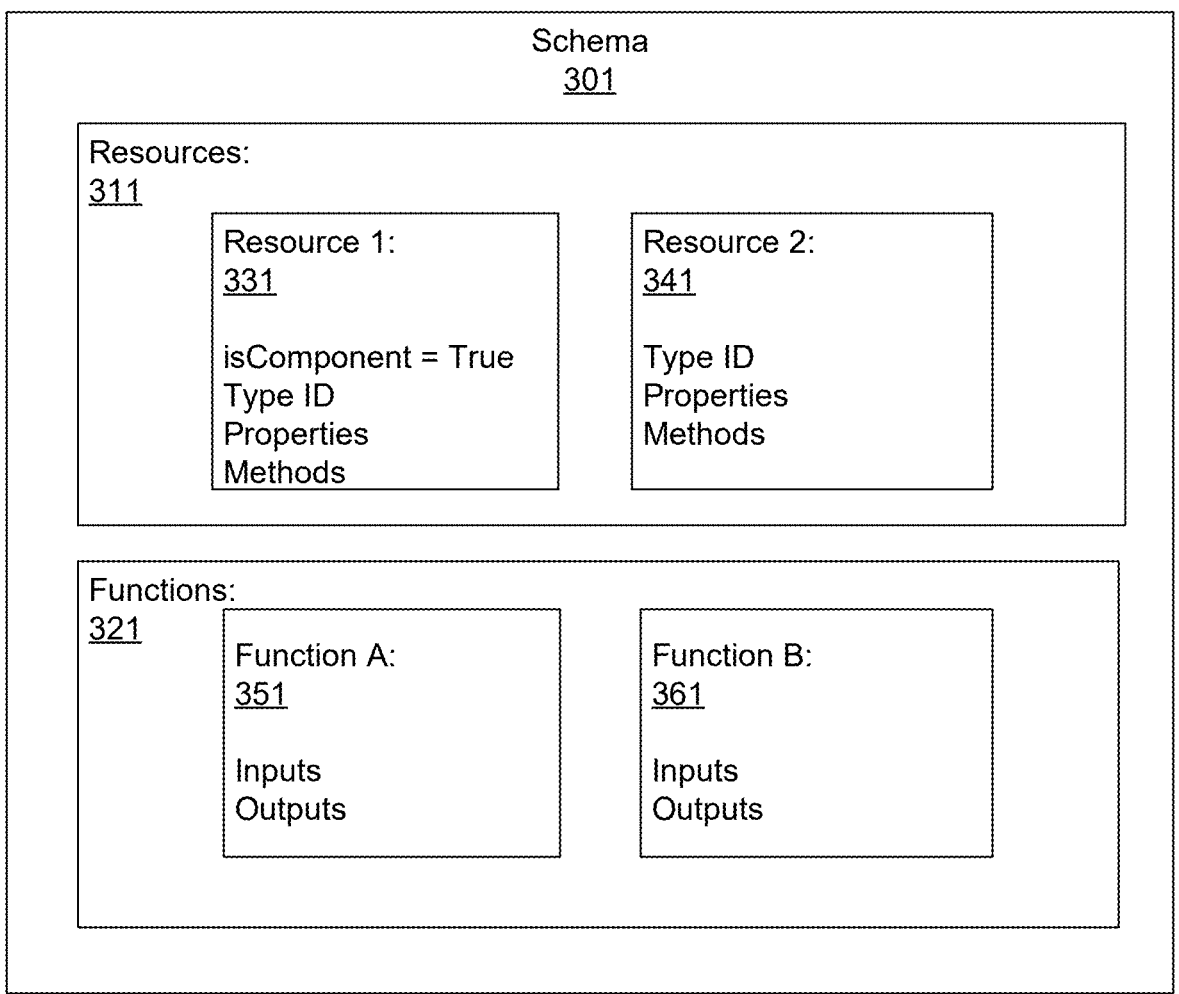
FIG. 3B shows an example data structure of a schema for the multi-language component, according to example embodiments.
Figure 3C:
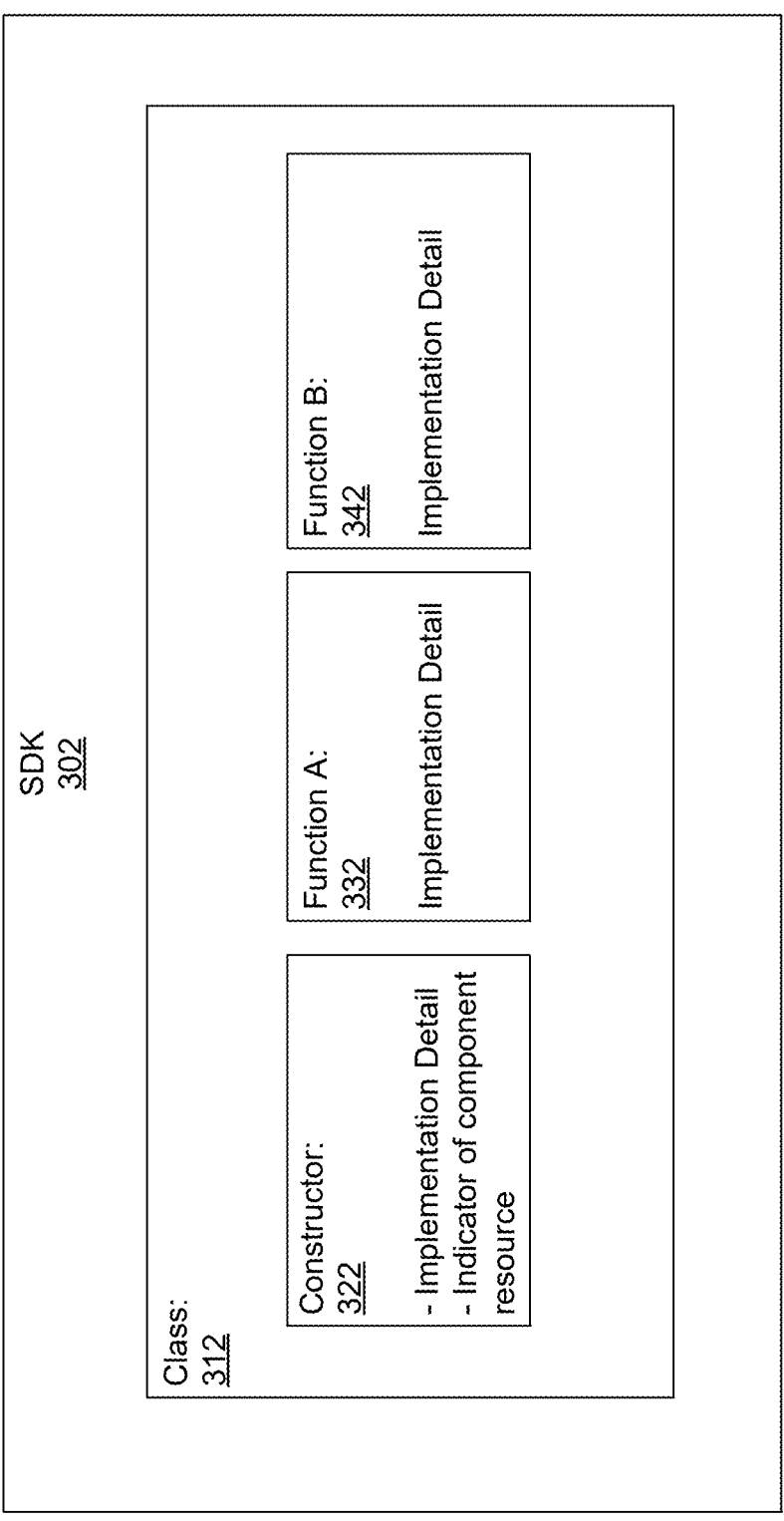
FIG. 3C shows an example data structure of a software development kit (SDK) generated based on the multi-language component, according to example embodiments.

FIG. 3B illustrates one exemplary data structure of a schema for component 300. Schema 301 may include information associated with resources 311 and functions 321 that are included in component 300. In the exemplary data structure shown in FIG. 3B, component 300 includes resources 331 (resource 1) and 341 (resource 2), each resource including information associated with the respective resource such as TypeID, properties and methods. Resource 1 may have an indicator that indicates the resource is a component resource (i.e. dependent on additional resources). For example, resource 1 may have an indicator that says "isComponent=True." SDK generator 204 may read this information and generate SDKs for the component resource. SDK generator 204 is discussed in further detail below. One concrete example of a set of related code for a simplified example component is provided below in Appendix A. Referring back to FIG. 2, SDK generator 204 generates SDKs for a multi-language component. In one embodiment, SDKs are generated based on a schema of a multi-language component, such as the one illustrated in FIG. 3B. Based on the indicator in resource 1 (FIG. 3B, 331) that says "isComponent=True," SDK generator 204 may process this information and include in the generated SDK a similar indicator indicating that the resource is a component resource. For example, FIG. 3C illustrates an exemplary SDK 302 generated based on schema 301 presented in FIG. 3B. The SDK 302 is for illustration purposes, while in reality a generated SDK may include more information such as libraries imported, additional classes and additional functions. The SDK generator 204 may generate an SDK for each supported language (e.g., JavaScript, TypeScript, Python, Go, C#, F #, HCL) based on the component 300. Therefore, structure and content of SDK 302 may also vary depending on the language that the SDK is generated in.

Continuing with the discussion of the structure of SDK 302 in FIG. 3C, SDK 302 may include class 312 with a constructor function 322 that constructs an instance of the component 300. Class 312 may also include function A 332 and function B 342, which are also included in the schema 301 in FIG. 3B. Implementation details of function A 332 and function B 342 may be defined in the implementation detail 303 in FIG. 3A. SDK generator 204 may generate an indicator in constructor 322 indicating that component 300 is a component resource because the component 300 depends on additional resources such as resources 331 (resource 1) and 341 (resource 2) as shown in FIG. 3B.

The multi-language component management module 146 can generate an SDK for different supported configuration language. A client device 120 may author a component in a first language L1 (e.g., TypeScript). In one embodiment the component may include a schema that describes information associated with the content in the component. Client device 120 may author the component via an interface provided by application 121 and publish the component in the multilanguage component management module 146 via application 121. Multi-language component management module 146 may create SDKs in a variety of supported languages such as JavaScript, TypeScript, Python, Go, C#, F #, and HCL. In one embodiment multi-language component management module 146 may publish the SDKs to respective package managers such as Node Package Manager (npm). Client device 120 may wish to use the component in a second language L2 such as Python. Client device 120 may download and import the SDK in Python via application 121. Client device 120 may request to generate an instance of the component in a program that client device 120 authors, specifying a set of input parameters that describe a desired state configuration for the component that client device 120 wishes to construct.

Figure 4:
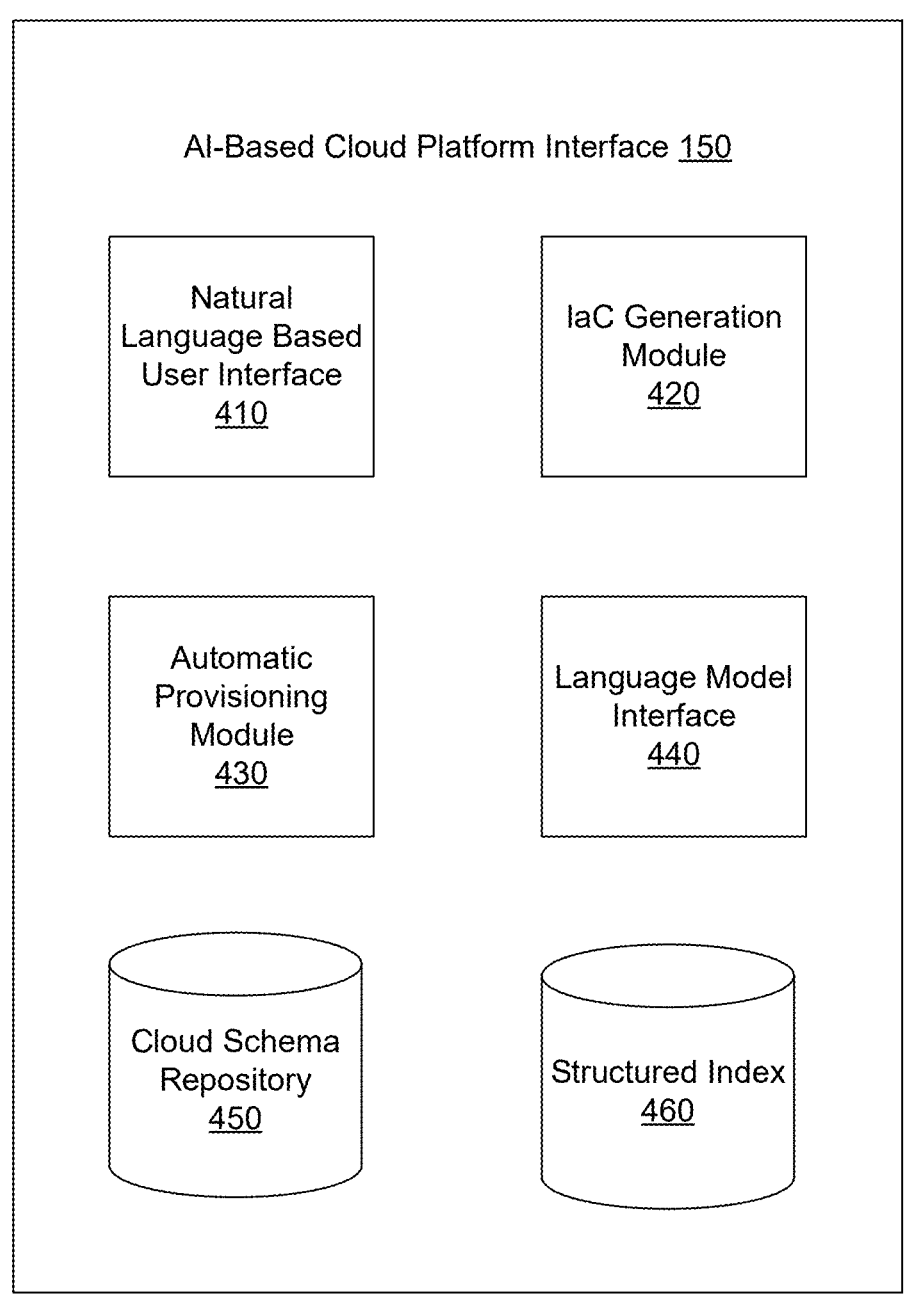
FIG. 4 shows an architecture of an AI-based cloud platform interface, according to example embodiments.

FIG. 4 shows an architecture of an AI-based cloud platform interface, according to example embodiments. The AI-based cloud platform interface 150 includes a natural language based user interface 410, an IaC generation module 420, an automatic provisioning module 430, a language model interface 440, and a cloud schema repository 450. Other embodiments may include more or fewer components than indicated in FIG. 4.

The natural language based user interface 410 provides a user interface via client devices to users to provide natural language based requests to the desired state configuration system 140. The user interface may be provided via the application 121 and may be include a text box that allows users to type in natural language based requests and includes a widget, for example, a panel to display the responses generated by the desired state configuration system 140. The natural language requests received from the users may be request for generating IaC from natural language description of desired configuration of the infrastructure on a cloud platform 135. The natural language requests may be for provisioning specific resources on a cloud platform 135.

The IaC generation module 420 receives natural language requests from users and generates IaC using a configuration language. The IaC generation module 420 interacts with the language model service 155 to execute the machine learning based language model 160 for generating the IaC. The IaC generation module 420 generates appropriate prompts for obtaining a desired response from machine learning based language model 160 of the language model service 155. The IaC generation module 420 executes the processes disclosed herein, for example, the process illustrated in FIG. 6 and described in connection with FIG. 6.

The automatic provisioning module 430 receives a natural language request describing a desired configuration of resources using a cloud platform 135. The automatic provisioning module 430 repeatedly interacts with the language model service 155 to execute the machine learning based language model 160 for generating the IaC and deploys the IaC on the cloud platform 135. The automatic provisioning module 430 checks whether the desired configuration was obtained as a result of deploying the IaC. If the desired configuration was not obtained, the automatic provisioning module 430 repeats the process by modifying the prompt provided to the machine learning based language model 160.

The language model interface 440 interacts with the language model service 155 to execute the machine learning based language model 160 based on prompts received from the IaC generation module 420 or the automatic provisioning module 430. The language model interface 440 invokes the APIs of the language model service 155 for executing the machine learning based language model 160. According to an embodiment, the machine learning based language model 160 is available locally in the desired state configuration system 140 and the language model interface 440 simply executes the machine learning based language model 160 by invoking the necessary function calls.

The cloud schema repository 450 stores schema of various cloud platforms. The schema describes the various resources supported by the cloud platform 135 for configuring the resources available at the cloud platform 135. The system generates language specific code from the schema representation that obtains a desired configuration on the cloud platform. According to various embodiments, the IaC generated for configuring the cloud platform conforms to the schema corresponding to the cloud platform 135.

According to an embodiment, the AI-based cloud platform interface 150 builds a structured index 460 using the information describing the cloud platforms including the schema descriptions stored in the cloud schema repository 450 and any documentation obtained from external systems including the cloud platforms and websites describing the cloud platforms.

The structured index 460 comprises data structures that store information describing various cloud platforms, for example, the schemas of each cloud platform stored in cloud schema repository 450 and documentation describing each cloud platform. Examples of such an index include GPT Index™ and LlamaIndex™. The structured index 460 allows the system to connect the corpus of information describing the cloud platforms with the machine learning based language model 160 so that the answers to a prompt are based on the knowledge of the machine learning based language model 160 as well as the information stored in the corpus. For example, in the system as disclosed the answers to prompts requesting sample IaC for desired cloud configurations are based on knowledge of the trained machine learning based language model 160 as well as the information describing the relevant cloud platform that is stored in the structured index 460.

A structured index, or vector database, stores records as pairs of vectors, the keys, and associated data, the values. The structured index receives a query in the form of a vector and returns the records with matching keys that are similar to the query. Similarity may be measured as the dot product of two vectors. To implement this search, the structured index uses approximate nearest neighbor (ANN) search algorithms and data structures such as hierarchical navigable small worlds (HNSW). Examples of vector databases include Pinecone™, and PostgreSQL™ with the PGvector extension.

According to an embodiment, the AI-based cloud platform interface 150 uses a structured index or a vector database that stores embeddings representing text, for example, portions of schema representations of cloud platform resources or natural language descriptions of portions of schema representations of cloud platform resources. According to an embodiment, the system identifies portions of schema representing resources of a cloud platform resources. The system may further generate or obtain from other sources examples of programming language code for using the resource. The system includes these code examples as well as the portion of the schema with the prompt that is provided to the machine learning based language model 160. Accordingly, the system generates a vector representation comprising embeddings for these portions of schema and/or example code and stores the embeddings and the text used to generate the embeddings in the vector database. The embeddings representing a natural language text may represent output of a hidden layer of a neural network that was provided the natural language text as input. The AI-based cloud platform interface 150 performs semantic searches of the portions of schema and examples using the vector database to identify relevant portions of the schema and examples for including in a prompt sent to the machine learning based language model 160.

According to an embodiment, the AI-based cloud platform interface 150 provides the portion of schema to the machine learning based language model 160 to generate a natural language description of the portion of the schema. The system further generates a vector representation of the natural language description of the portion of the schema. These embeddings generated from the natural language description of portion of the schema are referred to herein as synthetic embeddings. The system stores the synthetic embeddings in the vector database along with the text used to generate the synthetic embeddings.

The vector database allows semantic searches with natural language descriptions of portions of schema relevant to a natural language request from a user. The AI-based cloud platform interface 150 receives a natural language request from a user and transforms the natural language request into a vector representation comprising the embeddings based on the natural language request. The machine learning based model used to generate embeddings for the natural language request is the same machine learning based model used for generating embeddings for portions of schema or their natural language description. This allows the embeddings to be compared using similarity metrics to perform approximate nearest neighbor searches to identify portions of schema relevant to a natural language request.

Accordingly, the AI-based cloud platform interface 150 searches the vector database to identify portions of schema or natural language descriptions of the portions of schema that are relevant to a natural language request received from a user describing a desired configuration using a cloud platform. The schema or descriptions of schema is language agnostic. According to an embodiment, the AI-based cloud platform interface 150 generates language specific description of the portions of schema, for example, by generating example code using specific programming languages. The AI-based cloud platform interface 150 adds these portions of the schema or natural language descriptions of the portions of schema along with language specific examples to the prompt sent to the machine learning based language model 160 for generating the IaC. Accordingly, the prompt includes all the relevant portions of the schema describing the resources of the cloud platform for generating the IaC. According to an embodiment, the vector database allows nearest neighbor searches based on similarity metrics between two vectors, for example, cosine similarity.

The AI-based cloud platform interface 150 constructs one or more prompts for input to the machine learning based language model 160 including the natural language request received from the user and a context obtained from the structured index 460. In one instance, the context in the prompt includes information obtained from the structured index as contextual information for the query. For example, the prompt may include the natural language request received from the user and a representation of the schema of the cloud platform that is relevant to the natural language request. The representation of the schema may be an aggregate representation that aggregates information describing the various resources of the cloud platform specified using the schema.

Typically, the amount of information describing a cloud platform including the schema and other documentation exceeds prompt size limitations of the machine learning based language model 160. The AI-based cloud platform interface 150 resolves prompt size limitations by generating the structured index 460 of the information describing the cloud platforms.

According to an embodiment, the AI-based cloud platform interface 150 runs a type-checker over the resulting code generated by the machine learning based language model 160 to score the results and provide a feedback mechanism for training. Accordingly, generated code that has more type issues or other issues is associated with low score and code with fewer issues has high score.

User Interfaces

The system may provide a graphical user interface to users for interacting with the desired state configuration system 140. Alternatively, the system provides a command line interface or an application programming interface.

Figure 5A:
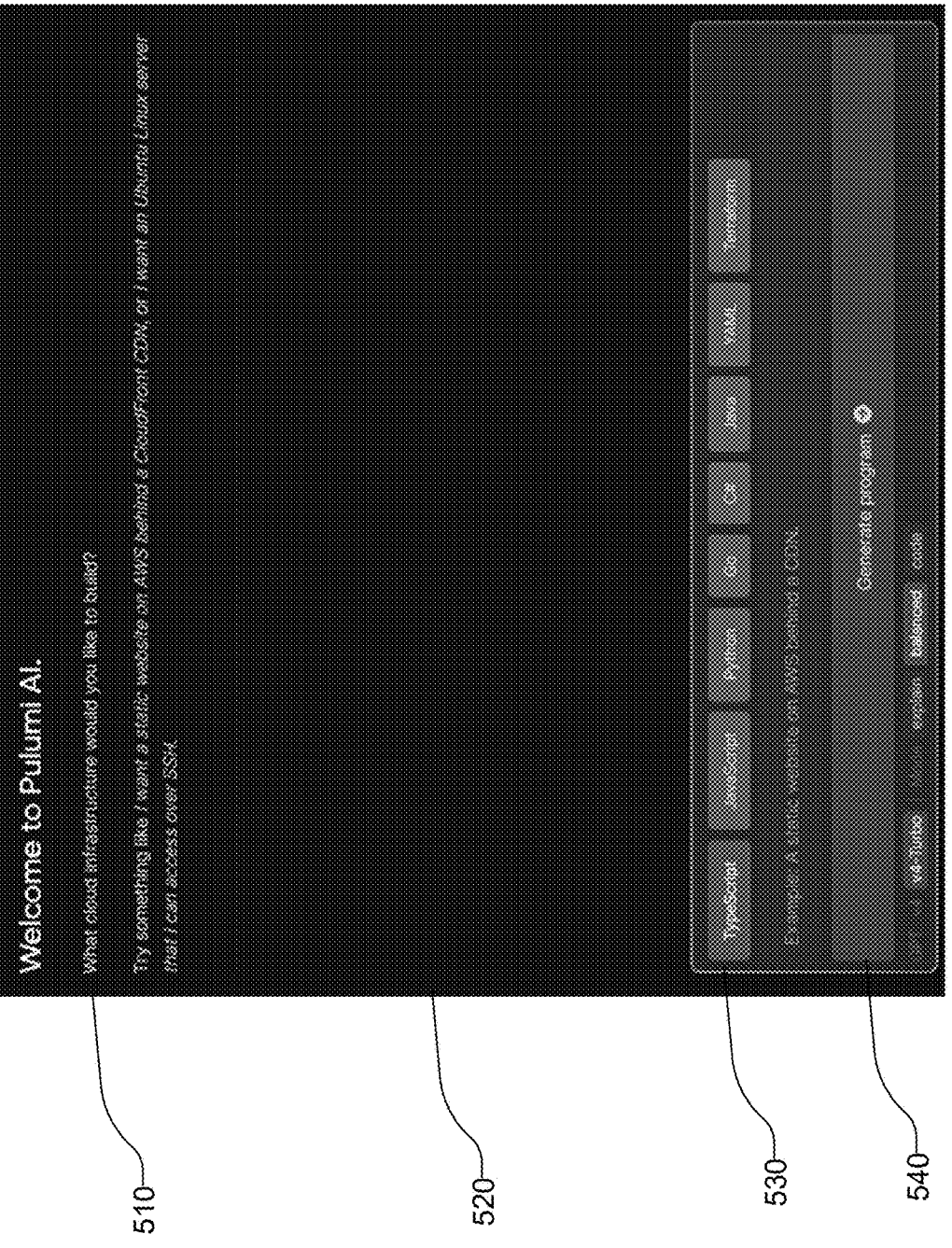
FIG. 5A shows a screenshot of a user interface for interacting with an AI-based cloud platform interface, according to example embodiments.

FIG. 5A shows a screenshot of a user interface for interacting with an AI-based cloud platform interface, according to example embodiments. As shown in FIG. 5A, the user is presented with a user interface that includes various widgets. The user interface may provide instructions 510 to the user to provide natural language requests along with examples of types of requests that the user can specify. The user interface includes a widget such as a text box that allows users to specify natural language requests as unstructured text. The user interface includes widgets such as buttons that allow users to identify a particular configuration language. Once the user has provided the natural language description of the desired cloud configuration, the user can generate the IaC corresponding to the natural language description using a submit button 540.

Figure 5B:
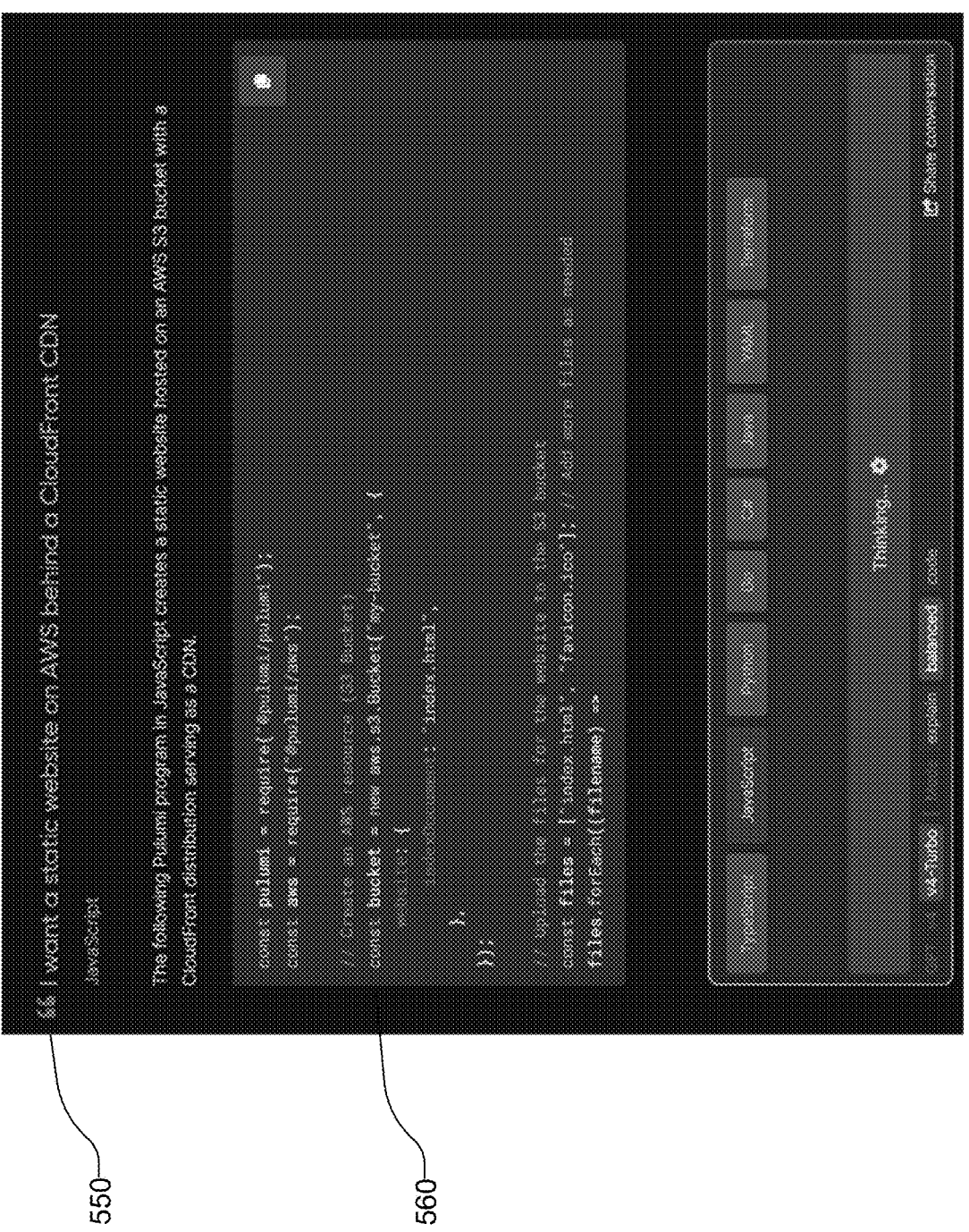
FIG. 5B shows a screenshot of a user interface illustrating generation of IaC using an AI-based cloud platform interface, according to example embodiments.

FIG. 5B shows a screenshot of a user interface illustrating generation of IaC using an AI-based cloud platform interface, according to example embodiments. As shown in FIG. 5B, the user interface displays the natural language request 550 provided by the user. For example, the user may request "I want a static website on AWS behind a CloudFront CDN" and the natural language request 550 is displayed on the user interface. The AI-based cloud platform interface 150 generates the IaC corresponding to the natural language request 550 of the user. The user interface further displays the IaC 560 generated by the AI-based cloud platform interface 150.

According to an embodiment, the desired state configuration system 140 provides a command line interface via a client device that can be used by users for providing natural language requests. In an exemplary interaction based on the graphical user interface or the command line interface, the desired state configuration system 140 may ask the user about the type of computing infrastructure that the user wants to build on a cloud platform. The desired state configuration system 140 may receive a natural language description of the desired configuration of computing infrastructure, for example, "an AWS VPC" indicating that the user wants to build a virtual private cloud (VPC) using Amazon Web Services (AWS). The desired state configuration system 140 interacts with the machine learning based language model 160 to generate the IaC for building the desired configuration, provisions the VPC according to the IaC generated by the machine learning based language model 160 and provides information describing the build configuration to the user via the user interface. The user may further add to the configuration, for example, by requesting "add three private networks" to add three private networks to the VPC. The desired state configuration system 140 repeats the above process to generate an IaC using the machine learning based language model 160 and provisioning three subnets in the VPC and provides the identifiers for the three subnets created to the user. Following is an example response of the system including the commands to create the private subnets, information indicating that the creation of the subnet was successful, and the identifiers of the subnets created as well as related information such as the identifier of the VPC.

create aws: ec2/subnet: Subnet private-subnet-2-2 . . .
    create aws: ec2/subnet: Subnet private-subnet-1-1 . . .
    create aws: ec2/subnet: Subnet private-subnet-3-3 . . .
    created private-subnet-2-2
    created private-subnet-3-3
    created private-subnet-1-1
    privateSubnetIds: subnet-abc1,subnet-abc2,subnet-abc3
    vpcId: vpc-nnn The user may further modify the configuration by providing a natural language request, for example, requesting to remove one of the subnets by providing the request "remove one of the subnets." The desired state configuration system 140 responds by generating the IaC for taking the action by executing the machine learning based language model 160 and providing the following information to the user indicating the command used to delete the subnet, the result of execution of the command indicating whether the command was successfully executed, and the identifiers of the remaining subnets and the identifier of the VPC.

delete aws: ec2/subnet: Subnet private-subnet-3-3 . . .
    deleted private-subnet-3-3
    privateSubnetIds: subnet-abc1,subnet-abc2
    vpcId: vpc-nnn Following is another example interaction between the user and the desired state configuration system 140 for configuring a computing infrastructure and interactively modifying the computing infrastructure using natural language interactions. The following interaction indicates that the user can specify high-level specification of the desired computing infrastructure without specifying specific details and the desired state configuration system 140 is able to determine the information by executing the machine learning based language model 160 using the appropriate prompts.

In this example, the user indicates to the desired state configuration system 140 that the user wants to build "an s3 bucket." The desired state configuration system 140 builds an S3 bucket and provides the information describing the commands and the information describing S3 bucket to the user. The user next specifies that the user wants to modify the current computing infrastructure as follows: "add an index.html file that says "Hello, world!" in three languages." Accordingly, the user requests the desired state configuration system 140 to add an index.html file that says "Hello, world" in three different languages, without specifying which particular languages. The desired state configuration system 140 interacts with the machine learning based language model 160 to identify the three different languages that may be most relevant to the user's context. The user subsequently requests "give me a url for that index.html file" asking the desired state configuration system 140 to provide a URL (uniform resource locator) for the index.html file.

The desired state configuration system 140 may not always be able to answer the user's natural language questions correctly or be able to create the desired computing infrastructure since the user is providing high-level descriptions of the desired computing infrastructure and any requests without specifying exact details and the desired state configuration system 140 uses the machine learning based language model 160 to predict the users intent and the predicted intent may not match the users actual intent. For example, in response to the request to provide the URL to the index.html file, the desired state configuration system 140 may respond with an answer that includes an undefined URL such as "indexUrl: http://undefined/index.html". The user can identify the discrepancy in the response generated by desired state configuration system 140 for example, by indicating that the URL is undefined and further requesting the system to fix the error. For example, the user's subsequent request may be "That gave an undefined url. Can you fix it?" The desired state configuration system 140 repeats the above process to provide the correct URL, for example, "indexUrl: http://my-bucket-region-2.amazonaws.com/index.html."

Accordingly, the desired state configuration system 140 is able to process natural language requests that are not constrained by any specific syntax and may or may not specify all the details of the desired configuration. The desired state configuration system 140 uses the machine learning based language model 160 to determine the user's intent based on the high-level natural language description and generate IaC best on the interpretation of the natural language request for the user. If there are errors in generating the desired computing infrastructure, the desired state configuration system 140 may iteratively modify the prompts provided to the machine learning based language model 160 to fix the errors. If the desired state configuration system 140 generates a computing infrastructure that fails to match the actual intent of the user behind the natural language request or description, the desired state configuration system 140 receives further natural language requests from the user to fix identify the discrepancies and fix them to determine the actual user's intent and generate the appropriate IaC and configure the computing infrastructure on the cloud platform accordingly. The above example, is based on AWS cloud platform but the techniques disclosed are not limited to any specific cloud platform and can be applied to other cloud platforms such as GCP (Google Cloud Platform), Azure, and so on.

Processes

The FIG. 6 shows an exemplary process for generating IaC for a cloud platform using machine learning based language model, according to example embodiments. The steps of the process may be performed a system, for example, desired state configuration system 140. For example, the steps may be performed by the AI-based cloud platform interface 150.

The AI-based cloud platform interface 150 receives a natural language request for generating IaC for configuring a cloud infrastructure using a target cloud platform. The IaC is specified using a configuration language supported by the desired state configuration system 140. The target cloud platform may have been specified previously, for example, via a configuration or specified via one or more natural language requests.

The AI-based cloud platform interface 150 extracts 620 a portion of schema of the target cloud platform relevant to the natural language request. The AI-based cloud platform interface 150 further selects a configuration language for configuring IaC for the target cloud platform. The configuration language for achieving a desired configuration using a cloud platform may be selected by the user using a user interface or may be automatically selected by the system, for example, based on a default value for a cloud platform, for example, TypeScript. The configuration language may be specified by the user using a configuration parameter.

The AI-based cloud platform interface 150 generates 630 a prompt for the machine learning based language model 160. The generated prompt requests the machine learning based language model 160 to generate IaC using the configuration language to configure cloud infrastructure in accordance with the natural language request. According to an embodiment, the AI-based cloud platform interface 150 determines a portion of the schema for the cloud platform relevant to the natural language request and includes a description of the portion of schema in the prompt.

The AI-based cloud platform interface 150 sends 640 the generated prompt to the language model service 155 with a request for executing the machine learning based language model 160 using the generated prompt.

The AI-based cloud platform interface 150 receives a response from the language model service 155. The language model service 155 obtains the response by executing the machine learning based language model 160 using the prompt generated by the AI-based cloud platform interface 150. The response received from the language model service 155 includes IaC specified using the configuration language.

According to an embodiment, the AI-based cloud platform interface 150 causes the IaC specified using the configuration language to be displayed via a user interface, for example, a user interface of the application 121 running on the client device 120. According to an embodiment, the AI-based cloud platform interface 150 receives instructions to provision resources of the target cloud platform using the generated IaC. The deployment engine 144 executes the IaC to provision the required resources on the target cloud platform according to the natural language request received 610.

Configuring Computing Infrastructure on Cloud Platforms

Figure 7:
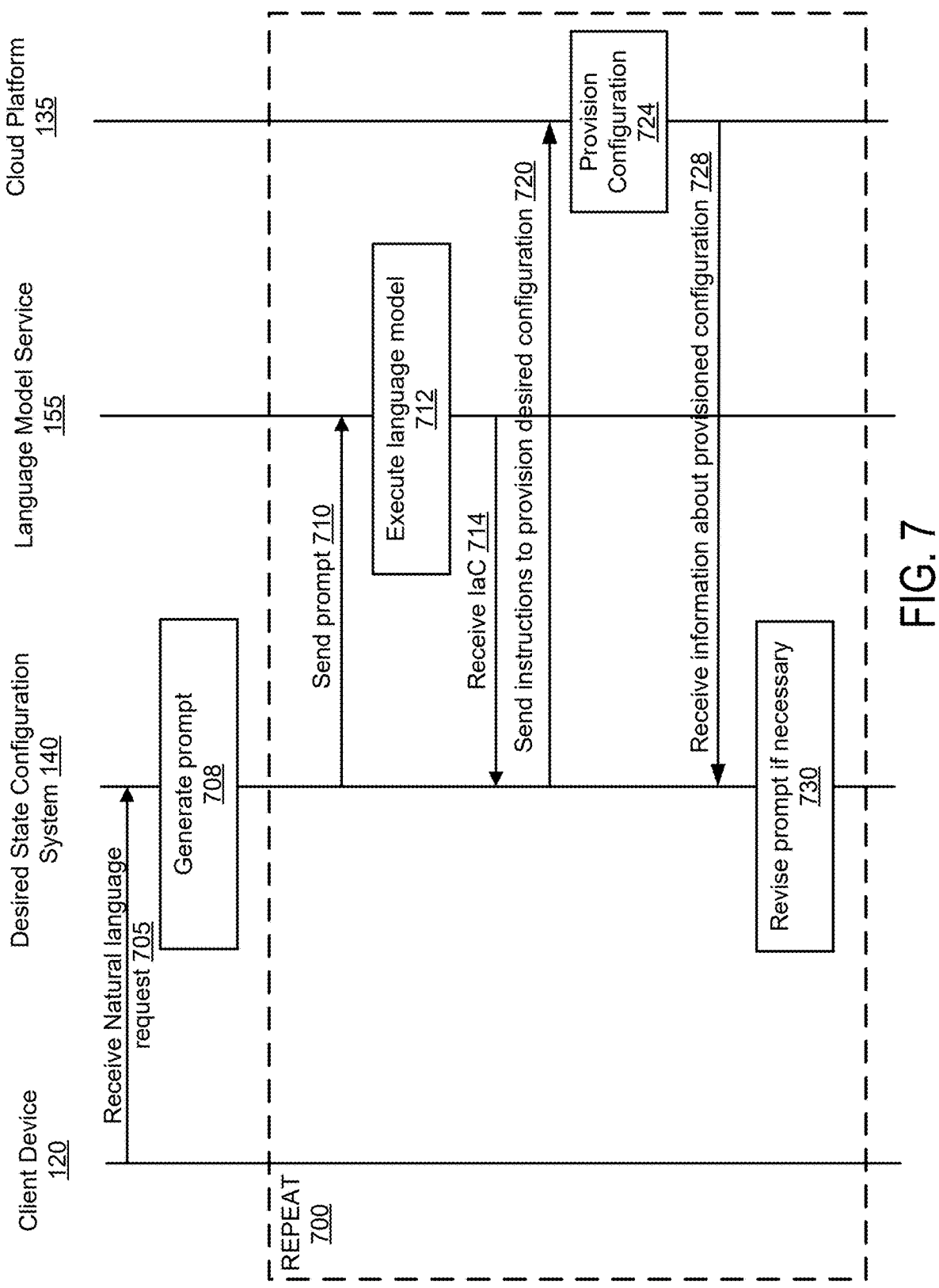
FIG. 7 shows an interaction diagram illustrating provisioning of resources on a cloud platform using machine learning based language model, according to example embodiments.

FIG. 7 shows an interaction diagram illustrating provisioning of resources on a cloud platform using machine learning based language model, according to example embodiments. As shown in FIG. 7, the desired state configuration system 140 receives 705 a natural language request to provision resources using a cloud platform from the client device 120. The natural language request may describe a desired computing infrastructure using the cloud platform. The desired state configuration system 140 generates 708 a prompt for sending to the machine learning based language model 160 provided by the language model service 155. The desired state configuration system 140 sends 710 the prompt to the language model service 155. The language model service 155 executes 712 the machine learning based language model 160 using the prompt received from the desired state configuration system 140. The response generated by the machine learning based language model 160 includes the IaC for generating the computing infrastructure described in the user's natural language request. The desired state configuration system 140 receives 714 from the language model service 155, the response including the IaC generated by the machine learning based language model 160.

The desired state configuration system 140 sends 720 the necessary instructions to the cloud platform 135 to provision 720 the desired configuration as specified by the natural language request. The cloud platform 135 provisions 724 the desired configuration of the computing infrastructure. The desired state configuration system 140 receives 728 information related to the provisioned configuration from the cloud platform 135. For example, if there was any error generated during the provisioning 725 of the configuration, the desired state configuration system 140 receives the error message from the cloud platform 135.

If the desired state configuration system 140 receives an error message from the cloud platform or determines otherwise that the configuration provisioned by the cloud platform does not match the desired configuration specified by the natural language request, the desired state configuration system 140 revises the prompt and repeats 700 the above steps to send 710 the revised prompt.

The desired state configuration system 140 may revise the prompt based on input from the user or may automatically revise the prompt. For example, the desired state configuration system 140 may send the generated error to the machine learning based language model 160 to determine the cause of the error. The desired state configuration system 140 revises 730 the prompt by describing the cause of the error and instructing the machine learning based language model 160 to re-generate the IaC so as to remove the cause of error. The desired state configuration system 140 repeats 700 the above steps including steps 710, 712, 714, 720, 724, 728, and 730 until the desired configuration as specified by the natural language request is obtained using the cloud platform 135.

Figure 8:
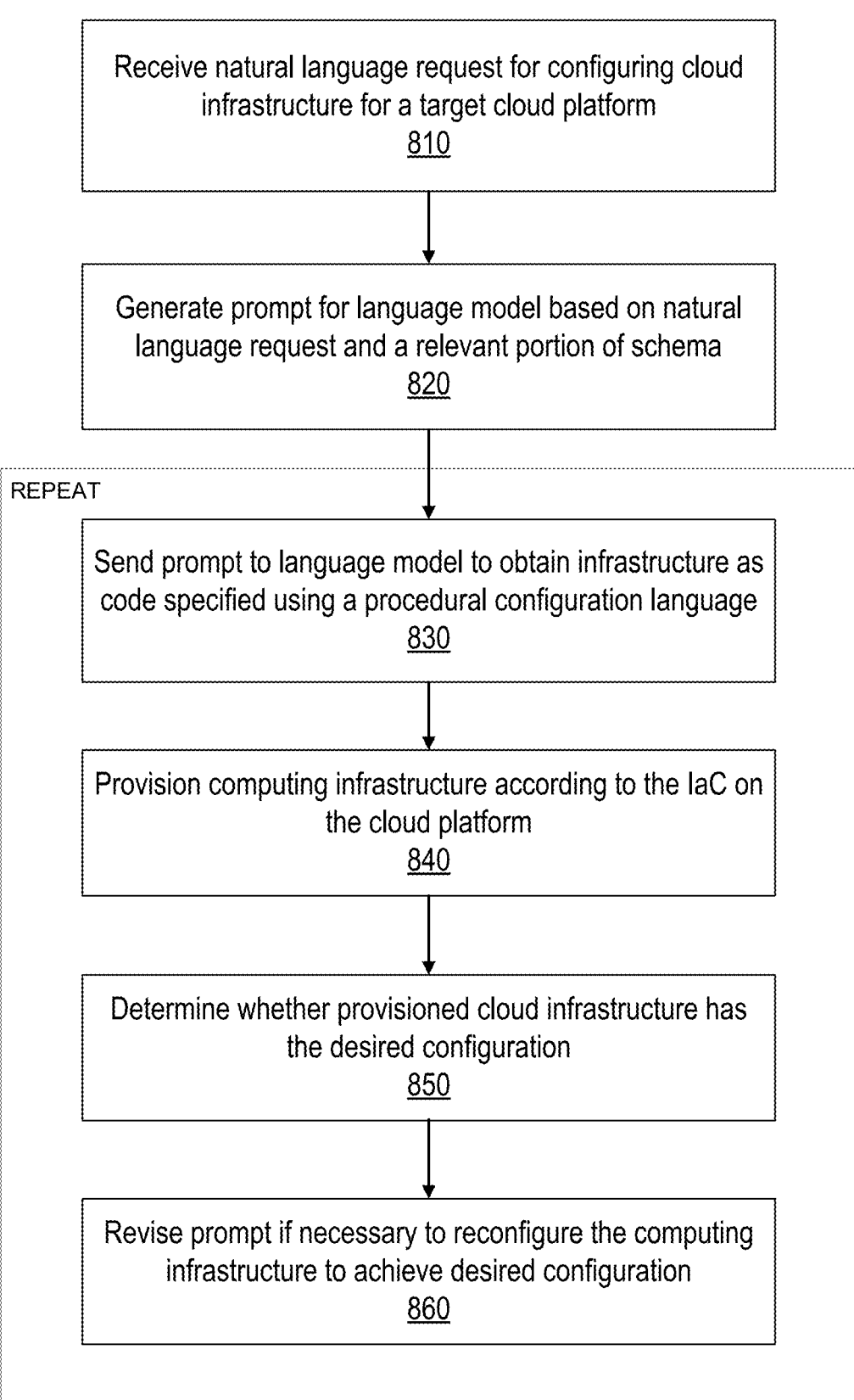
FIG. 8 shows an exemplary process for provisioning of resources on a cloud platform using machine learning based language model, according to example embodiments.

FIG. 8 shows an exemplary process for provisioning of resources on a cloud platform using machine learning based language model, according to example embodiments. The steps may be performed by the desired state configuration system 140. The steps may be performed in an order different from that indicated herein.

The desired state configuration system 140 receives a natural language request for configuring a computing infrastructure using a cloud platform 135. The natural language request may be provided by a user using the client application 125 running on a client device 120. The desired state configuration system 140 generates 820 a prompt for requesting a machine learning based language model to generate IaC to configure a computing infrastructure using the cloud platform in accordance with the natural language request.

The desired state configuration system 140 repeats the following steps 830, 840, 850, 860 until the desired configuration is achieved using the cloud platform 135. The desired state configuration system 140 sends 830 the prompt to the language model service 155 for executing the machine learning based language model. The desired state configuration system 140 receives the response from the machine learning based language model including the IaC specified using a configuration language for deploying on the cloud platform 135. The desired state configuration system 140 executes the necessary instructions to provision the computing infrastructure using the cloud platform 135 according to the IaC specified using the configuration language obtained from the machine learning based language model.

The desired state configuration system 140 determines 850 whether the provisioned computing infrastructure on the cloud platform matches the desired computing infrastructure. For example, the desired state configuration system 140 monitors any errors received from the cloud platform 135 while provisioning the necessary computing infrastructure. If the desired state configuration system 140 determines that there was an error in provisioning the computing infrastructure on the cloud platform, the desired state configuration system 140 reconfigures the computing infrastructure deployed on the cloud platform by revising 860 the prompt as necessary. The desired state configuration system 140 may provide the error message received from the cloud platform 135 to the machine learning based language model 160 using a prompt and request the machine learning based language model 160 to generate an IaC to eliminate the received error.

The desired state configuration system 140 may use APIs of the cloud platform 135 to generate a representation of the computing infrastructure provisioned on the cloud platform 135 and compare the computing infrastructure provisioned with the desired computing infrastructure to determine whether the two match. According to an embodiment, the desired state configuration system 140 generates a prompt for the machine learning based language model 160 describing the current computing infrastructure on the cloud platform 135 and the natural language request and ask the machine learning based language model 160 to generate IaC to bridge the gap between the current computing infrastructure on the cloud platform 135 and the natural language request.

Technical Improvements

The techniques disclosed herein improve over conventional techniques by providing an improved user interaction and user experience by allowing users to specify natural language requests to generate IaC for configuring cloud platforms. The system uses a machine learning based language model to generate a desired configuration of the cloud platform. The system determines the current configuration of the cloud platform and generates the IaC to modify the current configuration to obtain the desired configuration. A machine learning based language model has lower accuracy when generating code such as IaC compared to generation of desired configuration. This is so because actual instructions for obtaining a desired configuration may require large amount of code and can be complex. In contrast, the description of the desired configuration is simple and easier to generate by a machine learning based language model.

Generating IaC or any representation of desired state configuration as output is very helpful in allowing the machine learning based language model 160 to solve problems, because the AI-based cloud platform interface 150 does not need to track state of the actions taken. The machine learning based language model 160 simply generates changes to a description of desired state, and the AI-based cloud platform interface 150 makes those changes to the cloud platform to achieve the requested desired state. The machine learning based language model 160 can iteratively make changes to this text-based representation of desired state to accomplish non-trivial sets of changes.

The machine learning based language model 160 performs much better since the task of the machine learning based language model 160 is simplified to modifying a textual description of the desired configuration. A language model that generates a discreet and complex list of procedural actions to take (create resource, delete resource, reconfigure resource, and so on.) has much less accuracy and is more likely to generate incorrect instructions. Accordingly, the techniques disclosed simplify the output generated by a machine learning based language model 160 and thereby improve the accuracy of the output generated by the machine learning based language model 160.

Following table shows experimental results comparing a system that does not use the techniques disclosed herein with a system that uses the processes disclosed herein to generate IaC. The quality of the system was measured using typecheck rate representing the likelihood of generating a valid program on the first output from the machine learning based language model. The performance was measured for four popular cloud platforms. The column "Performance Before" shows measure of performance in a system that does not use the techniques disclosed herein, for example, the system does not utilize a large language model to generate embeddings for use with a structured index. This column shows values of typecheck rate between 11% and 30% for the major cloud platforms. The column "Performance After" shows the typecheck rate of a system that uses the techniques disclosed herein and the "Improvement" column shows the improvements observed as a result of using the techniques. As a result of implementing the technique disclosed herein the typecheck rate improved significantly across all cloud providers, between 1.45 times and 2.69 times.

| Cloud Platform | Performance Before | Performance After | Improvement |
| --- | --- | --- | --- |
| Amazon Web Services | 29.8% | 43.3% | 1.45 times |
| Google Cloud | 14.3% | 33.6% | 2.35 times |
| Microsoft Azure | 10.8% | 29.0% | 2.69 times |
| Kubernetes | 22.5% | 39.1% | 1.74 times |
| Other Top 20 | 9.2% | 23.1% | 2.51 times |

Accordingly, the techniques disclosed herein including use of a machine learning based language model for generating desired configuration based on cloud platforms, using a vector database to identify portions of schema of a target cloud platform relevant to a natural language request and using these portions in a prompt processed by the machine learning based language model was experimentally observed to provide significant improvement in performance measures such as typecheck rate. Furthermore, by preprocessing the schemas to generate information stored in a vector database and using the nearest neighbor search, the AI-based cloud platform interface 150 performs low latency (e.g., zero-shot) searches to generate high quality (i.e., high accuracy/recall) prompts for a broad range of natural language requests received from users.

Additional Considerations

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

In this description, the term "module" refers to a physical computer structure of computational logic for providing the specified functionality. A module can be implemented in hardware, firmware, and/or software. In regard to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. Languages that formally support the modules include Ada, Algol, BlitzMax, COBOL, D, Dart, Erlang, F, Fortran, Go, Haskell, IBM/360 Assembler, IBM i Control Language (CL), IBM RPG, Java, MATLAB, ML, Modula, Modula-2, Modula-3, Morpho, NEWP, JavaScript, Oberon, Oberon-2, Objective-C, OCaml, several derivatives of Pascal (Component Pascal, Object Pascal, Turbo Pascal, UCSD Pascal), Perl, PL/I, PureBasic, Python, and Ruby, though other languages may support equivalent structures using a different terminology than "module."

It will be understood that the named modules described herein represent one embodiment of such modules, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more computer processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a non-transitory, tangible computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present technology is not described with reference to any particular programming language. It will be appreciated that a variety of programming languages may be used to implement the teachings of the present technology as described herein, and any references below to specific languages are provided for disclosure of enablement and best mode of the present technology.

While the technology has been particularly shown and described with reference to a preferred embodiment and several alternate embodiments, it will be understood by persons skilled in the relevant art that various changes in form and details can be made therein without departing from the spirit and scope of the technology.

Finally, it should be noted that the language used in the specification has been principally selected for readability and instructional purposes and may not have been selected to delineate or circumscribe the inventive subject matter. Accordingly, the disclosure of the present technology is intended to be illustrative, but not limiting, of the scope of the technology, which is set forth in the following claims.

What is claimed is:

1. A computer-implemented method of configuration of computing infrastructure using cloud platforms, the computer-implemented method comprising:

storing a plurality of schemas, each schema describing application programming interfaces for interacting with a cloud platform of a plurality of cloud platforms;

receiving, via a user interface, a natural language request for configuring a computing infrastructure using a cloud platform;

generating a first prompt for requesting a machine learning based language model to generate infrastructure-as-code to configure a computing infrastructure using the cloud platform in accordance with the natural language request, the first prompt comprising a relevant portion of a schema for the cloud platform;

providing, to the machine learning based language model, the first prompt with a request for executing the machine learning based language model;

obtaining from the machine learning based language model, a first infrastructure-as-code specified using a configuration language for deploying on the cloud platform;

configuring the cloud platform using the first infrastructure-as-code specified using the configuration language obtained from the machine learning based language model;

determining whether the computing infrastructure is deployed on the cloud platform by determining whether an error message indicating an error was received while configuring the cloud platform using the first infrastructure-as-code or while reconfiguring the computing infrastructure deployed on the cloud platform; and responsive to determining that the computing infrastructure failed to deploy on the cloud platform reconfiguring the computing infrastructure deployed on the cloud platform, comprising:

responsive to determining that an error message was received, generating a second prompt based on the error message received, wherein the second prompt requests the machine learning based language model to regenerate infrastructure-as-code to overcome the error, and obtaining from the machine learning based language model a second infrastructure-as-code specified using the configuration language for deploying on the cloud platform.

2. The computer-implemented method of claim 1, wherein reconfiguring the computing infrastructure deployed on the cloud platform comprises:

reconfiguring the cloud platform using the second infrastructure-as-code obtained from the machine learning based language model by executing the machine learning based language model using the second prompt.

3. The computer-implemented method of claim 1, wherein the configuration language is one of following: JavaScript, TypeScript, Python, Go, C#, F #, or HCL.

4. The computer-implemented method of claim 1, further comprising:

determining a portion of a schema of the cloud platform, wherein the first prompt comprises description of the portion of the schema.

5. The computer-implemented method of claim 1, wherein the plurality of schemas is stored in a structured index associated with the machine learning based language model, wherein the infrastructure-as-code specified using the configuration language is generated using the machine learning based language model and the schema for the cloud platform stored in the structured index.

6. The computer-implemented method of claim 1, further comprising:

receiving a pretrained machine learning based language model; and further training the machine learning based language model using the plurality of schemas.

7. The computer-implemented method of claim 1, wherein the cloud platform is a first target cloud platform, wherein the natural language request is a particular natural language request, the computer-implemented method further comprising:

receiving, via the user interface, the particular natural language request for configuring the computing infrastructure using a second target cloud platform using the configuration language;

generating a second prompt for the machine learning based language model, the second prompt requesting the machine learning based language model to configure the computing infrastructure using the second target cloud platform in accordance with the particular natural language request;

providing, to the machine learning based language model, the second prompt with a second request for executing the machine learning based language model;

obtaining from the machine learning based language model, infrastructure-as-code specified using a configuration language for deploying on the cloud platform; and configuring the cloud platform using the infrastructure-as-code specified using the configuration language obtained from the machine learning based language model.

8. A non-transitory computer-readable storage medium storing executable computer instructions that, when executed by one or more computer processors, cause the one or more computer processors to perform steps comprising:

storing a plurality of schemas, each schema describing application programming interfaces for interacting with a cloud platform of a plurality of cloud platforms;

receiving, via a user interface, a natural language request for building a target computing infrastructure using a cloud platform;

generating a first prompt for requesting a machine learning based language model to generate infrastructure-as-code to configure computing infrastructure using the cloud platform in accordance with the natural language request, the first prompt comprising a relevant portion of a schema for the cloud platform;

providing, to the machine learning based language model, the first prompt with a request for executing the machine learning based language model;

obtaining from the machine learning based language model, a first infrastructure-as-code specified using a configuration language for deploying on the cloud platform;

configuring the cloud platform using the first infrastructure-as-code specified using the configuration language obtained from the machine learning based language model;

determining whether the computing infrastructure is deployed on the cloud platform by determining whether an error message indicating an error was received while configuring the cloud platform using the first infrastructure-as-code or while reconfiguring the computing infrastructure deployed on the cloud platform; and responsive to determining that the computing infrastructure failed to deploy on the cloud platform reconfiguring the computing infrastructure deployed on the cloud platform, comprising:

responsive to determining that an error message was received, generating a second prompt based on the error message received, wherein the second prompt requests the machine learning based language model to regenerate infrastructure-as-code to overcome the error, and obtaining from the machine learning based language model a second infrastructure-as-code specified using the configuration language for deploying on the cloud platform.

9. The non-transitory computer-readable storage medium of claim 8, wherein reconfiguring the computing infrastructure deployed on the cloud platform comprises:

reconfiguring the cloud platform using the second infrastructure-as-code obtained from the machine learning based language model by executing the machine learning based language model using the second prompt.

10. The non-transitory computer-readable storage medium of claim 8, wherein the plurality of schemas is stored in a structured index associated with the machine learning based language model, wherein the first infrastructure-as-code specified using the configuration language is generated using the machine learning based language model and the schema for the cloud platform stored in the structured index.

11. The non-transitory computer-readable storage medium of claim 8, wherein the executable computer instructions further cause the one or more computer processors to perform steps comprising:

receiving a pretrained machine learning based language model; and further training the machine learning based language model using the plurality of schemas.

12. A system comprising:

one or more computer processors configured to execute instructions; and a memory storing executable computer instructions for execution on the one or more computer processors, including storing a plurality of schemas, each schema describing application programming interfaces for interacting with a cloud platform of a plurality of cloud platforms;

receiving, via a user interface, a natural language request for configuring a computing infrastructure using a cloud platform;

generating a first prompt for requesting a machine learning based language model to generate infrastructure-as-code to configure computing infrastructure using the cloud platform in accordance with the natural language request, the first prompt comprising a relevant portion of a schema for the cloud platform;

providing, to the machine learning based language model, the first prompt with a request for executing the machine learning based language model;

obtaining from the machine learning based language model, a first infrastructure-as-code specified using a configuration language for deploying on the cloud platform;

configuring the cloud platform using the first infrastructure-as-code specified using the configuration language obtained from the machine learning based language model;

determining whether the computing infrastructure is deployed on the cloud platform by determining whether an error message indicating an error was received while configuring the cloud platform using the first infrastructure-as-code or while reconfiguring the computing infrastructure deployed on the cloud platform; and responsive to determining that the computing infrastructure failed to deploy on the cloud platform reconfiguring the computing infrastructure deployed on the cloud platform, comprising:

responsive to determining that an error message was received, generating a second prompt based on the error message received, wherein the second prompt requests the machine learning based language model to regenerate infrastructure-as-code to overcome the error, and obtaining from the machine learning based language model a second infrastructure-as-code specified using the configuration language for deploying on the cloud platform.

13. The system of claim 12, wherein reconfiguring the computing infrastructure deployed on the cloud platform comprises:

reconfiguring the cloud platform using the second infrastructure-as-code obtained from the machine learning based language model by executing the machine learning based language model using the second prompt.

14. The system of claim 12, wherein the plurality of schemas is stored in a structured index associated with the machine learning based language model, wherein the first infrastructure-as-code specified using the configuration language is generated using the machine learning based language model and the schema for the cloud platform stored in the structured index.

15. The non-transitory computer-readable storage medium of claim 8, wherein the configuration language is one of following: JavaScript, TypeScript, Python, Go, C#, F #, or HCL.

16. The non-transitory computer-readable storage medium of claim 8, wherein the instructions further cause the one or more computer processors to perform steps comprising:

determining a portion of a schema of the cloud platform, wherein the first prompt comprises description of the portion of the schema.

17. The non-transitory computer-readable storage medium of claim 8, wherein the cloud platform is a first target cloud platform, wherein the natural language request is a particular natural language request, wherein the instructions further cause the one or more computer processors to perform steps comprising:

receiving, via the user interface, the particular natural language request for configuring the computing infrastructure using a second target cloud platform using the configuration language;

generating a second prompt for the machine learning based language model, the second prompt requesting the machine learning based language model to configure the computing infrastructure using the second target cloud platform in accordance with the particular natural language request;

providing, to the machine learning based language model, the second prompt with a second request for executing the machine learning based language model;

obtaining from the machine learning based language model, infrastructure-as-code specified using a configuration language for deploying on the cloud platform; and configuring the cloud platform using the infrastructure-as-code specified using the configuration language obtained from the machine learning based language model.

18. The system of claim 12, wherein the configuration language is one of following: JavaScript, TypeScript, Python, Go, C#, F #, or HCL.

19. The system of claim 12, wherein the instructions further cause the one or more computer processors to perform steps comprising:

determining a portion of a schema of the cloud platform, wherein the first prompt comprises description of the portion of the schema.

20. The system of claim 12, wherein the cloud platform is a first target cloud platform, wherein the natural language request is a particular natural language request, wherein the instructions further cause the one or more computer processors to perform steps comprising:

receiving, via the user interface, the particular natural language request for configuring the computing infrastructure using a second target cloud platform using the configuration language;

generating a second prompt for the machine learning based language model, the second prompt requesting the machine learning based language model to configure the computing infrastructure using the second target cloud platform in accordance with the particular natural language request;

providing, to the machine learning based language model, the second prompt with a second request for executing the machine learning based language model;

obtaining from the machine learning based language model, infrastructure-as-code specified using a configuration language for deploying on the cloud platform; and configuring the cloud platform using the infrastructure-as-code specified using the configuration language obtained from the machine learning based language model.

* * * * *